(12) United States Patent
Park et al.

(10) Patent No.: US 6,893,051 B1
(45) Date of Patent: May 17, 2005

(54) PIPE COUPLING

(75) Inventors: Chul Park, Incheon (KR); Eounjin Ko, Incheon (KR); Jongjae Shin, Incheon (KR); Jiyoung Bang, Incheon (KR)

(73) Assignee: Join Top Co., Ltd., Incheon (KR)

( * ) Notice: Subject to any disclaimer, the term of this patent is extended or adjusted under 35 U.S.C. 154(b) by 29 days.

(21) Appl. No.: 10/750,051

(22) Filed: Dec. 31, 2003

(51) Int. Cl.$^7$ .............................................. F16L 35/00
(52) U.S. Cl. ...................... 285/104; 285/305; 285/309; 285/310
(58) Field of Search ................................ 285/104, 105, 285/305, 307, 309, 310, 315, 316, 322

(56) References Cited

U.S. PATENT DOCUMENTS

| | | | | |
|---|---|---|---|---|
| 3,727,952 A | * | 4/1973 | Richardson | 285/101 |
| 3,884,508 A | * | 5/1975 | Jones | 285/31 |
| 4,540,201 A | * | 9/1985 | Richardson | 285/101 |
| 5,090,741 A | * | 2/1992 | Yokomatsu et al. | 285/101 |
| 5,181,751 A | * | 1/1993 | Kitamura | 285/39 |
| 5,284,369 A | * | 2/1994 | Kitamura | 285/322 |
| 5,551,735 A | * | 9/1996 | Takayanagi et al. | 285/323 |
| 5,580,100 A | * | 12/1996 | Umezawa et al. | 285/39 |
| 5,711,550 A | * | 1/1998 | Brandt | 285/101 |
| 5,887,911 A | * | 3/1999 | Kargula | 285/307 |
| 6,435,161 B1 | * | 8/2002 | Kato | 123/468 |

* cited by examiner

*Primary Examiner*—Eric K. Nicholson
(74) *Attorney, Agent, or Firm*—Bachman & LaPointe, P.C.

(57) ABSTRACT

Disclosed is a pipe coupling, which can connect pipes in a sealed condition. The pipe coupling includes: a connector body having pipe locking jaws having the same diameter as the inner diameter of a pipe inserted into the pipe coupling, and a taper part gradually reducing the inside space toward a free end of the pipe coupling and opened at a portion of the outer circumference in which a snap ring insertion hole is formed; a packing member inserted and mounted at the lower end of the taper part; a jaw coupling inserted and mounted into the taper part, and having a number of coupling holes for coupling fixing jaws and a seating hole formed in the upper portion thereof; a snap ring located in the seating hole of the jaw coupling, the outer circumference of the snap ring being compressed and inserted into the snap ring insertion hole, both ends of the snap ring being bended in a separated condition and exposed to the outside; and an elastic member interposed between the packing member and the jaw coupling.

4 Claims, 4 Drawing Sheets

PIPE COUPLING

BACKGROUND OF THE INVENTION

1. Field of the Invention

The present invention relates to a pipe coupling, and more particularly, to a pipe coupling, which can connect pipes of a predetermined length used for moving fluid in a sealed condition.

2. Background of the Related Art

In general, a pipe coupling serves to connect pipes in the longitudinal direction for the purpose of supply of city water or gas to houses or shops, and is classified into various type pipes, such as a straight pipe, a bended pipe, a T-shaped pipe, and so on, according to connection directions.

Particularly, it has been known that the most important thing in connection of fluid pipes is sealability and coherence.

The conventional pipe coupling is screwed with the pipes to be inserted, and packing members such as O-rings are interposed between the pipe coupling and the pipes. However, it is difficult and complex as the above pipe coupling requires a strong tightening force and additional tightening tools. Furthermore, if the connection between the pipe coupling and the pipes is not strong, the pipe coupling decreases its sealing effect and reliability of sealing maintenance.

Recently, to solve the above problems, various improved products for connecting and separating pipes and a pipe coupling in a one-touch way and for effectively keeping the sealing effect have been invented and sold in markets.

However, most of the pipe couplings have improved the sealability and pipe-coherence, but in a structural aspect, they still have a problem in connecting and separating a snap ring, which is one of essential components of the pipe coupling.

In more detail, for example, most of conventional snap rings have inconvenience in work and require lots of working time as the snap rings are inserted and fixed into snap ring insertion holes formed in the pipe coupling, and need a specific tool for fixing and separation of the snap rings due to a small and narrow working space.

Therefore, the conventional pipe couplings are not economical as the above process causes a result delaying the entire assembling processes of the pipe coupling.

SUMMARY OF THE INVENTION

Accordingly, the present invention has been made in view of the above problems, and it is an object of the present invention is to provide a pipe coupling, which can connect and separate snap rings easily and rapidly, and which can effectively keep its sealability.

To achieve the above object, according to the present invention, there is provided a pipe coupling including: a connector body having pipe locking jaws formed on the inside thereof and having the same diameter as the inner diameter of a pipe inserted into the pipe coupling, and a taper part formed at a side of the pipe locking jaws for gradually reducing the inside space toward a free end of the pipe coupling, the taper part being opened at a portion of the outer circumference in which a snap ring insertion hole is formed; a packing member inserted and mounted at the lower end of the taper part; a jaw coupling inserted and mounted into the taper part, the jaw coupling having a number of coupling holes for coupling fixing jaws in the circumferential direction and a seating hole formed in the upper portion thereof; a snap ring located in the seating hole of the jaw coupling, the outer circumference of the snap ring being compressed and inserted into the snap ring insertion hole, both ends of the snap ring being bended in a separated condition from each other and exposed to the outside through the outer circumference of the opened taper part; and an elastic member interposed between the packing member and the jaw coupling.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Figure 1:
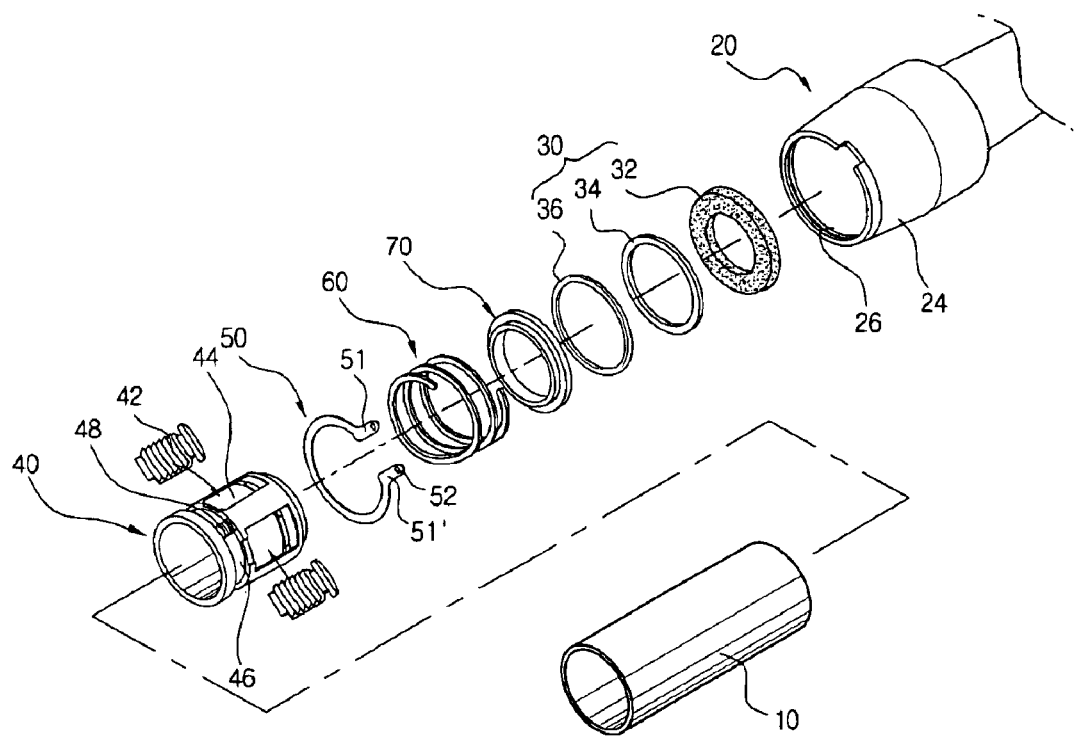
FIG. 1 is an exploded perspective view of a pipe coupling according to the present invention.
Figure 2:
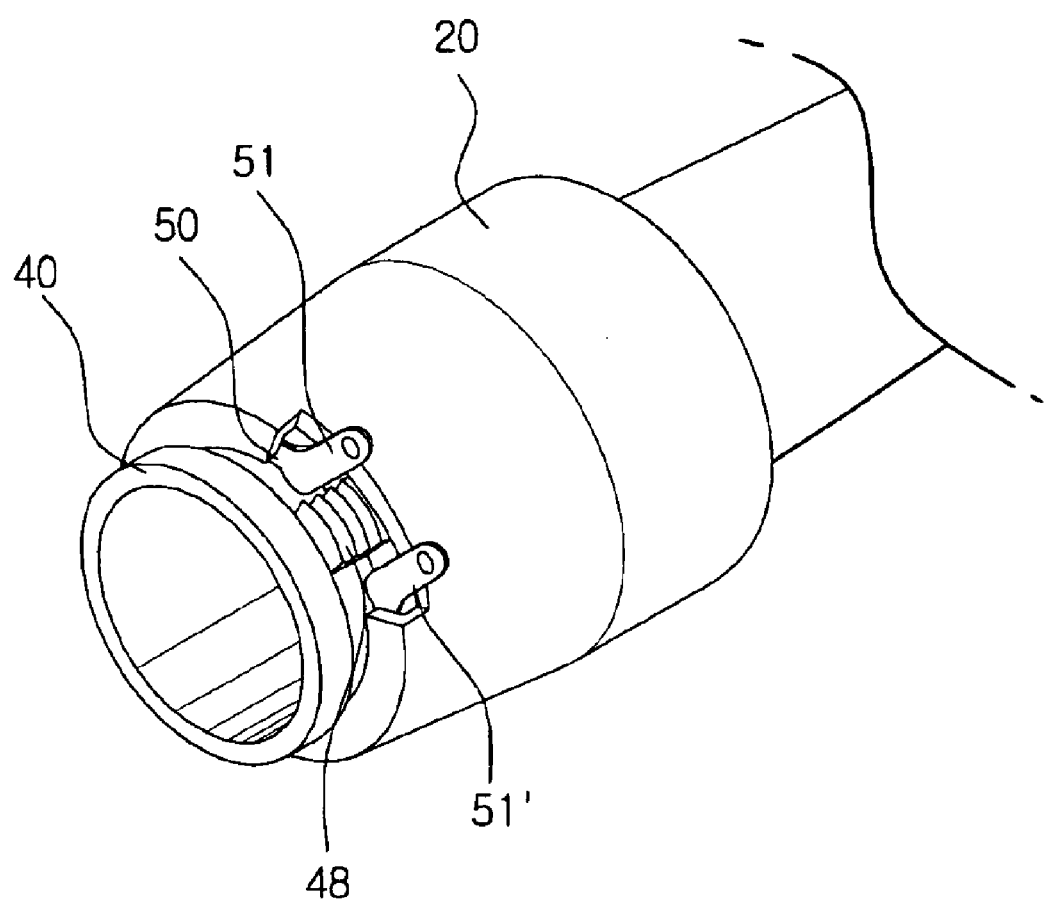
FIG. 2 is a perspective view showing a connected state of FIG. 1.
Figure 3:
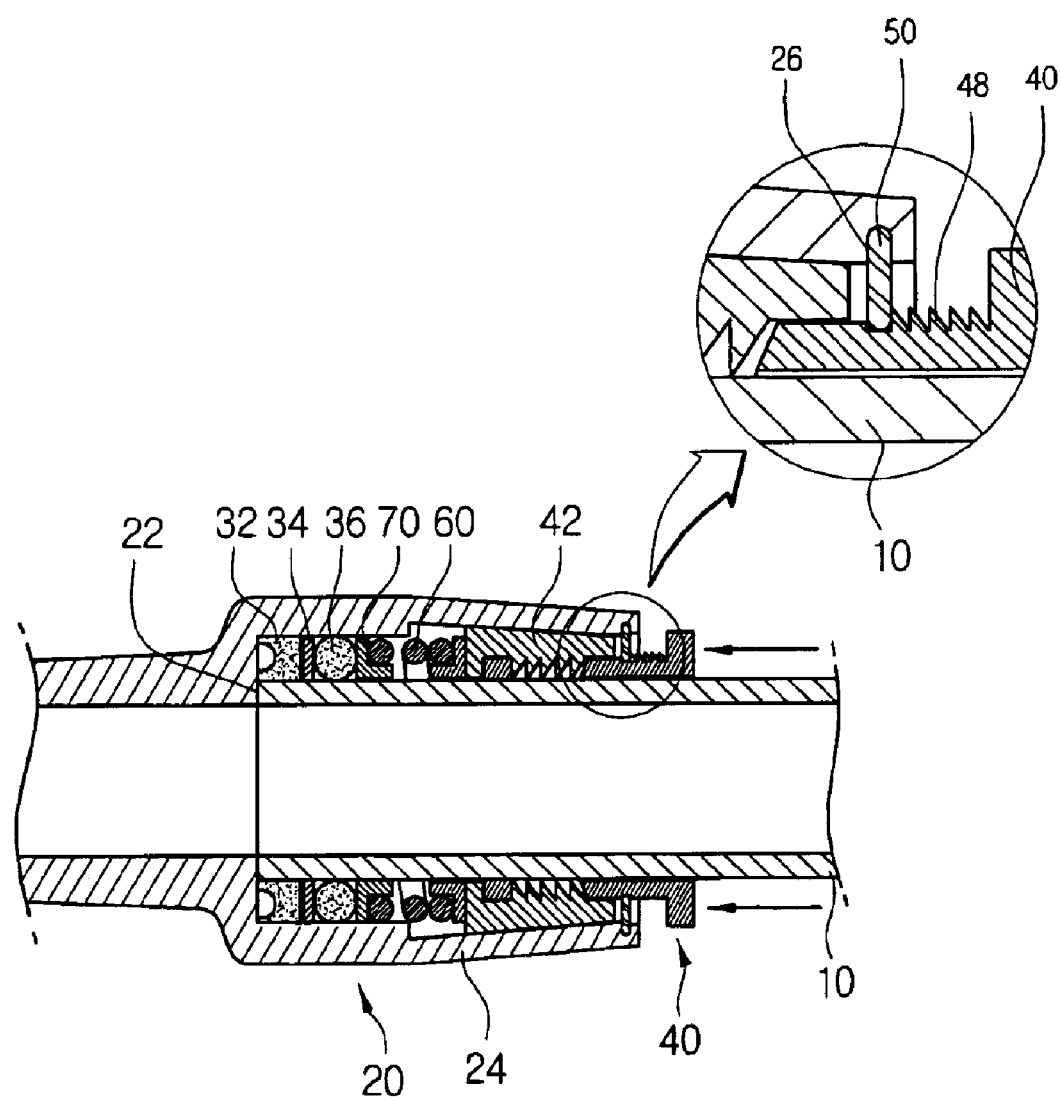
FIG. 3 is a sectional view of the pipe coupling according to the present invention.

FIG. 1 is an exploded perspective view of a pipe coupling according to the present invention, FIG. 2 is a perspective view showing a connected state of FIG. 1, and FIG. 3 is a sectional view of the pipe coupling. For convenience in description, only one side structure of the pipe coupling of the present invention will be described as structures of the right and left connection parts are the same.

As shown in the drawings, the pipe coupling according to the present invention includes: a connector body 20 having pipe locking end 22 formed on the inside thereof and having the same diameter as the inner diameter of a pipe 10 inserted into the pipe coupling, and a taper part 24 formed at a side of the pipe locking end 22 for gradually reducing the inside space toward a free end of the pipe coupling, the taper part 24 being opened at a portion of the outer circumference in which a snap ring insertion hole 26 is formed; a packing member 30 inserted and mounted at the lower end of the connector body 20 adjacent the locking end 22; a jaw coupling 40 inserted and mounted into the taper part 24, and having a number of coupling holes 44 for coupling fixing jaws 42 in the circumferential direction and a seating hole 46 formed in the upper portion thereof; a snap ring 50 located in the seating hole 46 of the jaw coupling 40, the outer circumference of the snap ring 50 being compressed and inserted into the snap ring insertion hole 26, both ends 51 and 51' being bended in a separated condition from each other and exposed to the outside through the outer circumference of the opened taper part 24; and an elastic member 60 interposed between the packing member 30 and the jaw coupling 40.

The pipe locking end 22 are to restrict the depth of pipe 10 to be inserted, and the snap ring insertion hole 24 a depth as deep as a portion of the outer circumference of snap ring 50 can be inserted thereinto.

The packing member 30 includes a V-packing 32, a backing ring 34, and an O-ring 36, which are piled up in order. The V-packing 32 first prevent leakage of fluid, the O-ring 36 second prevent leakage of fluid, which may occur once in a while, so that the packing member 30 can perfectly keep its sealability. The backing ring 34 is to prevent deformation of the V-packing 32 when the V-packing 32 is pushed back by pressure.

The jaw coupling 40 has a saw-type projection 48 formed at a side of the seating hole 46, and the saw-type projection 48 has a width narrower than a distance between the both ends 51 and 51' of the snap ring 50 to be detachably mounted on the inner circumference of the snap ring 50, thereby preventing loosening of a pipe compression state of the fixing jaw 42 by the jaw coupling 40 pushed into the connector body 20 due to load such as external impact.

An elastic member supporter 70 is interposed between the packing member 30 and the elastic member 60, thereby allowing the elastic member 60 to operate at a normal position smoothly and effectively preventing deformation due to a long-term use.

A user can check the coupled condition of the snap ring 50 with naked eyes through the opened surface of the taper part 24 when the snap ring 50, which is bended at the both ends 51 and 51', is inserted and fixed into the snap ring insertion hole 26 of the taper part 24, so that the user can perform work exactly and rapidly and easily remove the snap ring 50 by compressing the both ends 51 and 51' of the snap ring 50, which are exposed to the outside, using a tool. Anything will do if the tool for compressing the both ends 51 and 51' of the snap ring 50 can compress the snap ring 50.

The elastic member 60 moves elastically according to a change of the jaw coupling 40, and serves to induce a movement change of the fixing jaws 42, which is the core in connecting and separating the pipe 10 according to manipulation of the jaw coupling 40.

The reference numeral 52 designates a tool insertion hole.

A process of connecting the pip with the pipe coupling according to the present invention will be described briefly as follows.

When the pipe 10 is inserted into the jaw coupling 40, whose a portion is exposed, toward the front surface of the taper part 24 of the connector body 10, the elastic member 6 is compressed by the insertion force, and the fixing jaws 42 are pushed into the taper part 24, and then, the pipe 10 passing through the jaw coupling 40 reaches the pipe locking jaws 22 of the connector body 20.

At this time, the fixing jaws 42 are moved to the inside inclined surface of the taper part 24 by the insertion of the pipe 10, and spread to the outside as much as the expanded diameter of the taper part 24, so that a mutual interference between the outer circumference of the pipe 10 and the inner surface of the fixing jaws 42 is removed, and thereby, the pipe 10 can be easily inserted into the pipe coupling till the pipe 10 touches the pipe locking end 22.

At the same time with completion of the insertion of the pipe 10, the separated fixing jaws 42 compress the surface of the pipe 10 in all directions while the jaw coupling 40 is pushed in the opposite direction to the pipe locking end 22 by the elastic force of the elastic member 60, so that the pipe 10 is connected and fixed to the pipe coupling.

Figure 4:
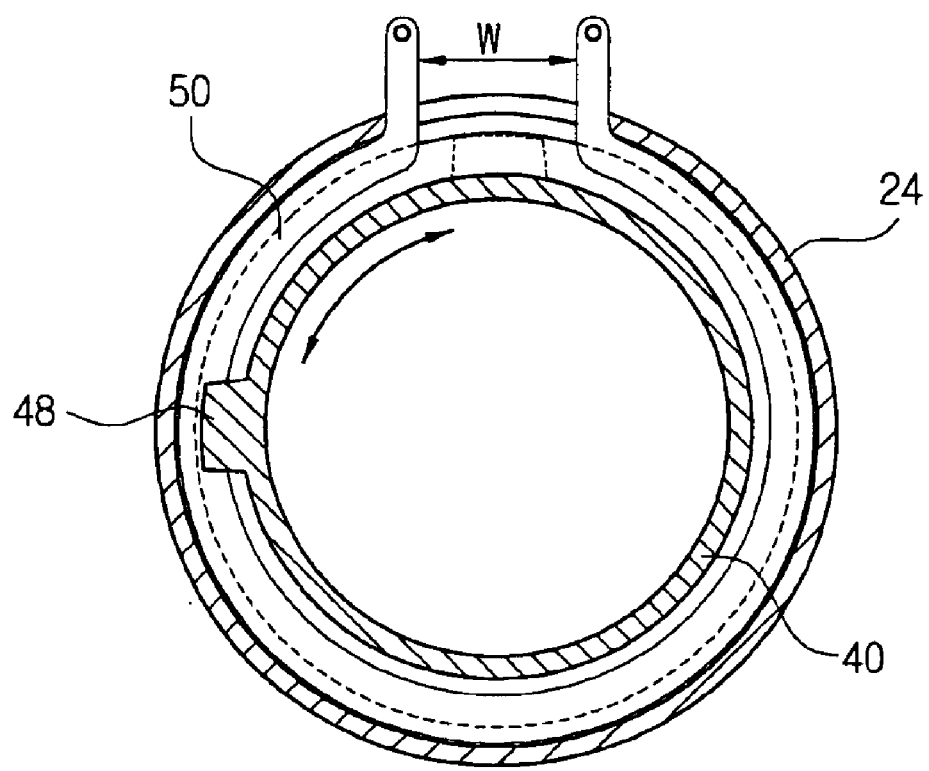
FIG. 4 is a sectional view showing a connected state of a saw-type projection of a jaw coupling and a snap ring according to the present invention.

FIG. 4 is a sectional view showing a connected state of the saw-type projection of the jaw coupling and the snap ring according to the present invention.

As shown in the drawing, as the jaw coupling 40 mounted in the taper part 24 is moved in a predetermined direction, the saw-type projection 48 interlocking with the jaw coupling 40 is moved from an interval portion W between the both ends 51 and 51' of the snap ring 50 and inserted and fixed into the inner circumference of the snap ring 50. Thereby, even though load is applied to the jaw coupling 40 due to the external impact, it is prevented that the jaw coupling 40 is moved into the taper part 24 by the coupling between the saw-type projection 48 and the snap ring 50.

When the pipe coupling is disassembled to replace the component such as the elastic member or the spring with a new one, the jaw coupling 40 is rotated in a reverse direction to return the saw-type projection 48 into the initial position, and then, the component to be replaced is removed.

As described above, the pipe coupling according to the present invention can improve manipulation efficiency and operation efficiency due to the easy connection and removal of the snap ring, and keep the connected condition firmly.

Therefore, the present invention is economical as reducing the operation period for assembly and disassembly of the pipe coupling.

Additionally, the pipe coupling can perfectly prevent leakage of fluid or gas as providing a double sealability of the V-packing and the O-ring.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A pipe coupling comprising:

a connector body having (1) pipe locking end formed on the inside thereof and having an inner diameter as the substantially the same as an inner diameter of a pipe inserted into the pipe coupling and (2) a taper part for gradually reducing the inside space toward a free end of the pipe coupling, the taper part being opened at a portion of a outer circumference thereof in which a snap ring insertion hole is formed;

a packing member inserted and mounted in the connector body adjacent the locking end;

a jaw coupling inserted and mounted into the taper part, the jaw coupling having a number of coupling holes for coupling fixing jaws in the circumferential direction and a seating hole formed in the upper portion thereof;

a snap ring located in the seating hole of the jaw coupling, an outer circumference of the snap ring being compressed and inserted into the snap ring insertion hole, the snap ring having ends bent in opposite directions from each other and exposed to the outside through the outer circumference of the opened taper part; and an elastic member interposed between the packing member and the jaw coupling.

2. The pipe coupling according to claim 1, wherein the packing member includes a V-packing, a backing ring, and an O-ring, which are aligned in order.

3. The pipe coupling according to claim 1, wherein an elastic member supporter is interposed between the packing member and the elastic member.

4. The pipe coupling according to claim 1, wherein the jaw coupling has a saw-type projection formed at a side of the seating hole, the saw-type projection having a width narrower than a distance between the both ends of the snap ring to be detachably mounted on the inner circumference of the snap ring.

* * * * *